Figure 1:
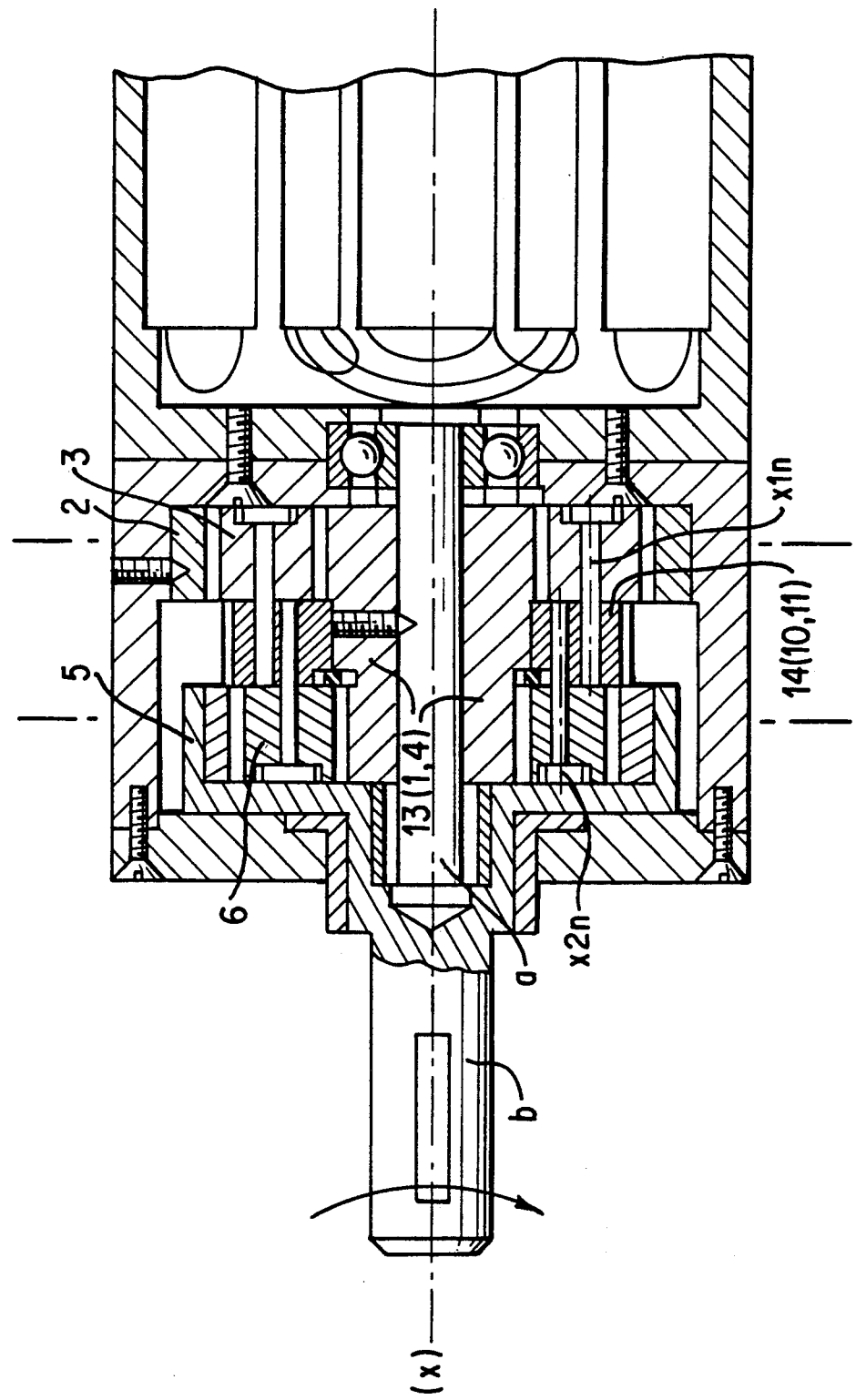

United States Patent [19]

Prokopius

[11] Patent Number: 5,062,824
[45] Date of Patent: Nov. 5, 1991

[54] MULTIFUNCTION GEARING MECHANISM

[76] Inventor: Josef P. Prokopius, 9 Compton Road, Wendover, Bucks HP22 6HR, United Kingdom, GR11 UEG

[21] Appl. No.: 302,241

[22] Filed: Jan. 27, 1989

[51] Int. Cl.⁵ ............................................. F16H 1/46
[52] U.S. Cl. ..................................................... 475/342
[58] Field of Search .................... 74/801; 475/342, 903

[56]       References Cited
       U.S. PATENT DOCUMENTS

| 1,015,477 | 1/1912 | Conant | 475/342 X |
| 1,609,076 | 11/1926 | Evans | 475/342 X |
| 1,637,818 | 8/1927 | Hawkins | 475/342 X |
| 4,229,996 | 10/1980 | Hildebrand | 475/903 X |

FOREIGN PATENT DOCUMENTS 2034434  1/1980  United Kingdom ................. 475/342

Primary Examiner—Dirk Wright
Attorney, Agent, or Firm—William F. Frank

[57]  ABSTRACT

Gearing mechanism comprising alike two stages of known planetary gearing arrangement with inner rotational members (1) and (4) mounted to common shaft (a) and the planetary gears (3) and (6) to one common carrier plate (10) and (11). The rotational input being provided by shaft (a), rotational output from outer rotational member (5) to shaft (b) and torque reaction means applied by connection of the outer rotational member (2) to a gearbox housing. Transmission ratio being determined by difference in ratio between the two alike planetary gearing stages.

4 Claims, 4 Drawing Sheets

MULTIFUNCTION GEARING MECHANISM

TECHNICAL FIELD

This invention relates to gearboxes, in particular to reduction of rotational speed mechanism.

BACKGROUND ART

Presently known concepts of gearbox mechanism especially in high reduction ratio and capacity form are constructed in multiple stages of gearing resulting in bulky and heavy devices.

PRESENTED ART

Introduced gearing mechanism attributes significant advantages in drastic reduction in size, weight, inertia, vibration, noise, backlash, count of parts and multipoint equal load distribution from transmitted torque. Variety of ratios up to millions:1 can be obtained by basic, single stage of this gearing. Its construction 'around one axis' as self-aligning and self-contained compact assembly enable almost any application in bulldozer, aircraft, helicopter, satellite, car, machine tool, toy and instrumentation, offering besides a fixed ratio, a variable ratio, smooth speed change or reverse option without a need to slow down, unload or stop and transmission by friction or by teeth of conventional evolvent engagement.

DISCLOSURE OF THE INVENTION

A multifunction gearing mechanism comprising at least one rotational unit (A), at least one rotational unit (B), both said rotational units symmetrically mounted in common axis of rotation, axis (x), at least one carrier plate (ten) or (eleven) symmetrically and rotatably mounted in said axis (x), and at least one combined rotational element, combined element (thirteen) so as to form a basic arrangement of the said mechanism, and with addition of at least one rotational unit (C) mounted symmetrically in axis (x), at least one carrier plate (twelve) symmetrically and rotatably mounted in the axis (x) and at least one combined element (fifteen) forming a full arrangement of the said Multifunction Gearing Mechanism in accordance with this invention,— —and the said rotational unit (A) and (B) alike each comprising at least three rotational members,—at least one rotational member (one) attributed to said rotational unit (A) and its counterpart at least one rotational member (four) attributed to said rotational unit (B), and at least one rotational member (two) attributed to said rotational unit (A) and its counterpart at least one rotational member (five) attributed to said rotational unit (B), and at least one rotational member (three) attributed to said rotational unit (A) and its counterpart rotational member (six) attributed to said rotational unit (B),—the rotational members (one) and (four) being smaller inner rotational members each having at least one outer rotational surface suitably shaped,—and the said rotational members (two) and (five) being larger outer rotational members each having at least one inner rotational surface suitably shaped and of such dimensions so as to accommodate the said smaller inner rotational members (one) or (four) inside the said larger outer rotational members (two) or (five) allowing enough clearance as to dispose between and make physical contact with the said outer and the said inner rotational surface of the said rotational members (one) and (two), or (four) and (five) at least one rotational member (three) or (six), the said at least one rotational member (three) and (six) each having at least one suitably shaped outer rotational surface so as to provide adequate said physical contact necessary for rotational engagement and rotational transmission within attributed rotational units directly or by means of at least two rotational members (three) or (six) being radially in physical contact with each other and each contacting only one of said rotational surface of rotational members (one) and (two) or (four) and (five), said rotational members (three) and (six) being rotatably mounted in their attributed rotational axes, $(x1n)$ or $(x2n)$, each having its individual axis $(xn)$, to or within at least one carrier plate (ten) or (eleven), the said carrier plate being symmetrically and rotatably mounted in axis (x) and the said at least one rotational member (three) or (six) rotating in its attributed rotational axis $(x1n)$ or $(x2n)$ and orbiting in at least one orbital path (D1) or (D2) between the said outer and the said inner rotational surface of rotational members (one) and (two) or (four) and (five),—by this arrangement a rotational engagement between the said rotational unit (A) or (B) and the carrier plate (ten) or (eleven) is being provided,—and a rotational engagement between the said rotational unit (A) and the said rotational unit (B) being completed by means of at least one said combined element (thirteen) consisting of at least two elements in any combination of rigidly connected or provided within, so as to form one ridig combined element (thirteen), from the said at least one combination of any from at least two rotational members (one), (two), (four) or (five), or at least two said carrier plates (ten) and (eleven) or any at least one combination of at least one rotational member (one), (two), (four) or (five) with at least one said carrier plate (ten) or (eleven) and at least one from the said rotational members or said carrier plates in the said one combination being attributed to counterpart rotational unit—this arrangement forming the said basic arrangement of the said mechanism,—and with the addition of at least one rotational unit (C) comprising of at least one rotational member (seven), at least one rotational member (eight), each having at least one rotational surface suitably shaped and disposed between and in physical contact with the said rotational surface of rotational members (seven) and (eight) being at least one rotational member (nine) having at least one outer rotational surface suitably shaped so as to provide rotational engagement and rotational transmission within the said rotational unit (C), the said rotational member (nine) being rotatably mounted in its attributed rotational axis $(y1n)$, each having its individual rotational axis $(yn)$, to or within at least one carrier plate (twelve), and in such arrangement said rotational member (nine) rotating around its attributed rotational axis $(yn)$ and orbiting around axis (x) in at least one orbital path (D3), the said carrier plate (twelve) rotatably and symmetrically mounted in axis (x) is being rotated and is providing a means of principal rotational output, and ia total rotational engagement with the said rotational units (A) and (B) with rotational unit (C) being alike provided by means of at least one combined element (fifteen) comprising alike said combined element (thirteen) at least two elements, at least one combination of one element from rotational members (one), (two), (four) or (five) or said carrier plate (ten) or (eleven) with at least one element from said rotational members (seven) or (eight) or with said carrier plate (twelve), the said combination comprising at least one rotational member or carrier plate attributed to counterpart said rotational unit.

Rotational input and output can be provided to and obtained from any said rotational member or carrier plate and variable speed transmission option provided by tilting rotational axis (x1n) or (x2n) in the friction transmission version where the said rotational member (three) or (six) is serving as a means of rotational input. Fixed transmission ratio is being determined by difference in mean diameters of counterpart rotational members and by particular internal arrangement of the mechanism.

A torque reaction means has to be provided to at least one appropriate rotational member or to the carrier plate, or to a bearing of a shaft connected to said rotational member (three) or (six), if providing the means of the rotational input, by fixed rigid connection, for fixed ratio or by means of conventional arrangement of a clutch or a brake for smooth speed change or reversing, to a relatively stationary body outside the said mechanism.

The said physical contact of said rotational members providing the rotational engagement and rotational transmission is being provided by means of friction in low torque applications or by means of teeth in applications with higher transmission torque.

A specific embodiment of the Invention will now be described by the way of example with reference to accompanying drawings FIG. 1-7 in which is being represented by item:

(1)—inner rotational member (one) having outer rotational surface suitably shaped.

(2)—outer rotational member (two) having inner rotational surface suitably shaped.

(3)—rotational member (three) having outer rotational surface suitably shaped.

(4)—inner rotational member (four) having outer rotational surface suitably shaped.

(5)—outer rotational member (five) having inner rotational surface suitably shaped (6)—rotational member (six) having outer rotational surface suitably shaped.

(7)—rotational member (seven) having suitably shaped rotational surface.

(8)—rotational member (eight) having suitably shaped rotational surface.

(9)—rotational member (nine) having suitably shaped outer rotational surface.

(10)—carrier plate (ten) attributed to rotational unit (A)

(11)—carrier plate (eleven) attributed to rotational unit (B)

(12)—carrier plate (twelve) attributed to rotational unit (C)

Figure 2:
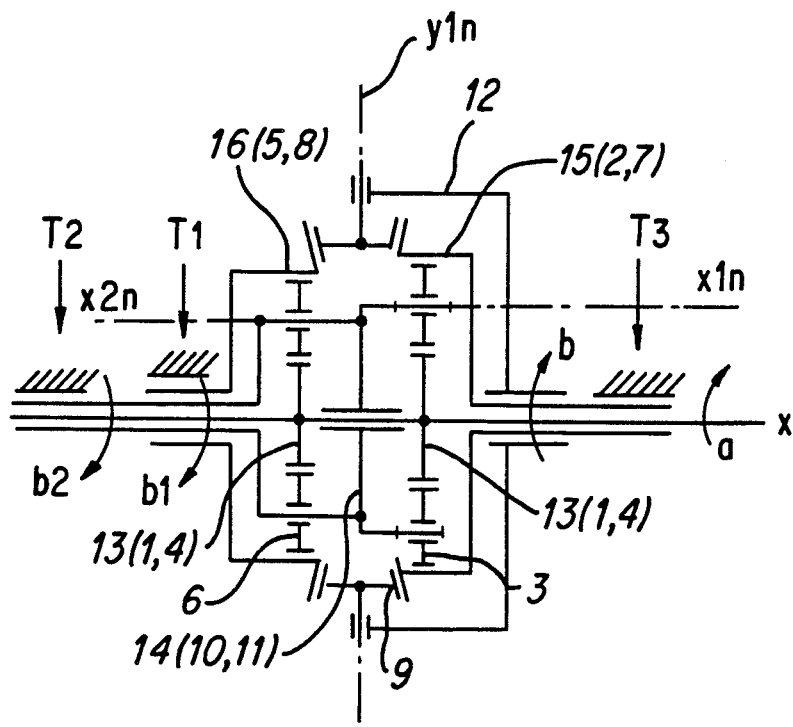
Figure 4:
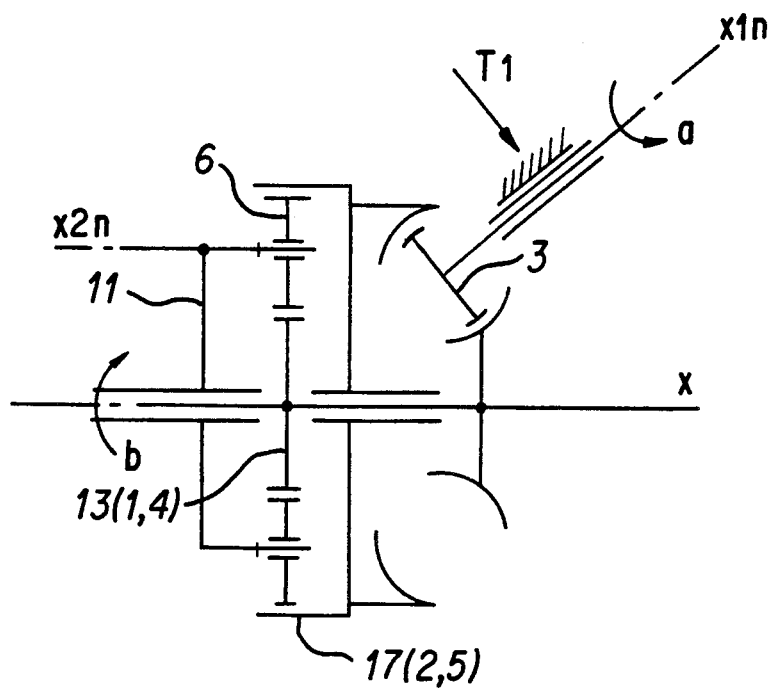

(13)—combined element (thirteen) consisting of rotational members (1) and (4) in FIG. 1, FIG. 2 and FIG. 4

Figure 3:
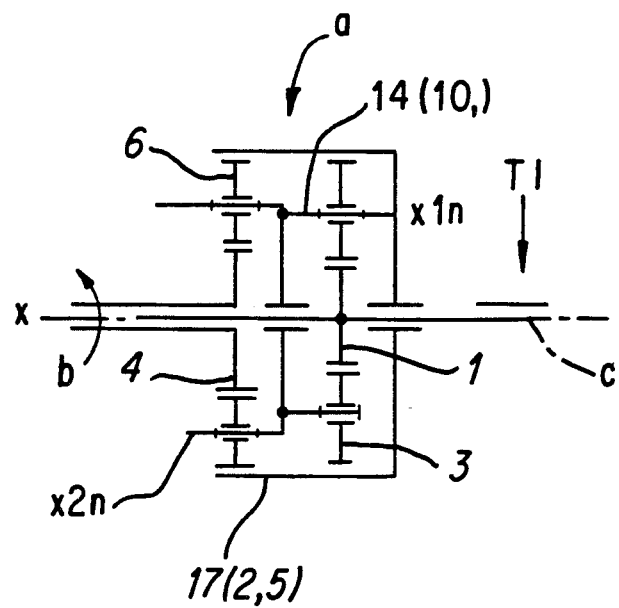

(14)—combined element (forteen) consisting of carrier plates (10) and (11) in FIG. 1, FIG. 2 and FIG. 3

(15)—combined element (fifteen) consisting of rotational members (2) and (7) in FIG. 2

(16)—combined element (sixteen) consisting of rotational members (5) and (8) in FIG. 2

Figure 5:
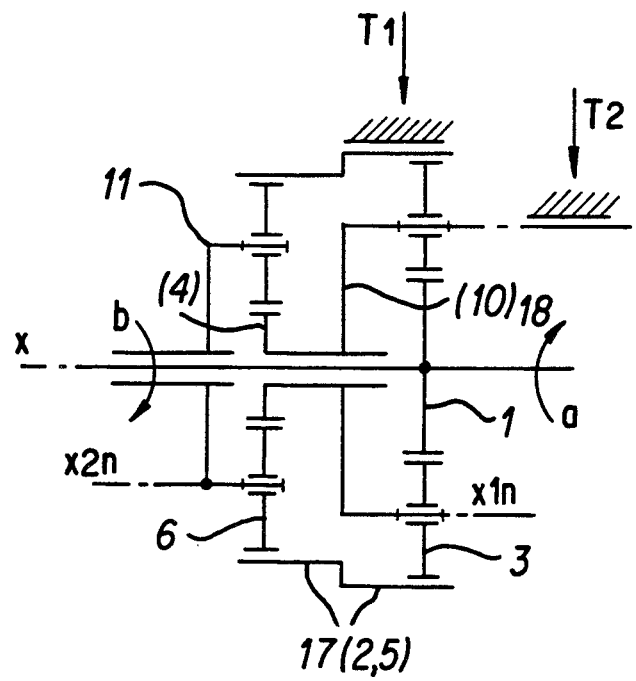

(17)—combined element (seventeen) consisting of rotational members (2) and (5) in FIG. 3, FIG. 4 and FIG. 5

(18)—combined element (eighteen) consisting of carrier plate (10) and rotational member (4) in FIG. 5

(x)—common axis of rotation, axis (x)

(1n)—axis of rotation attributed to rotational member (3)

(x2n)—axis of rotation attributed to rotational member (6)

(xn)—axes of rotation of multiples of rotational members (3) or (6)

(y1n)—axis of rotation attributed to rotational member (9)

(yn)—axes of rotation of multiples of rotational members (9)

(a)—means of principal rotational input (b)—means of principal rotational output (b1)—means of optional rotational output in FIG. 2

(b2)—means of optional rotational output in FIG. 2

(c)—spindle as torque reaction means in FIG. 3

(T1)—principal torque reaction means for forward rotation of output means (T2)—torque reaction means for reverse rotation of output means (T3)—optional torque reaction means for speed change (D1)—orbital path of rotational member (3)

(D2)—orbital path of rotational member (6)

Figure 7:
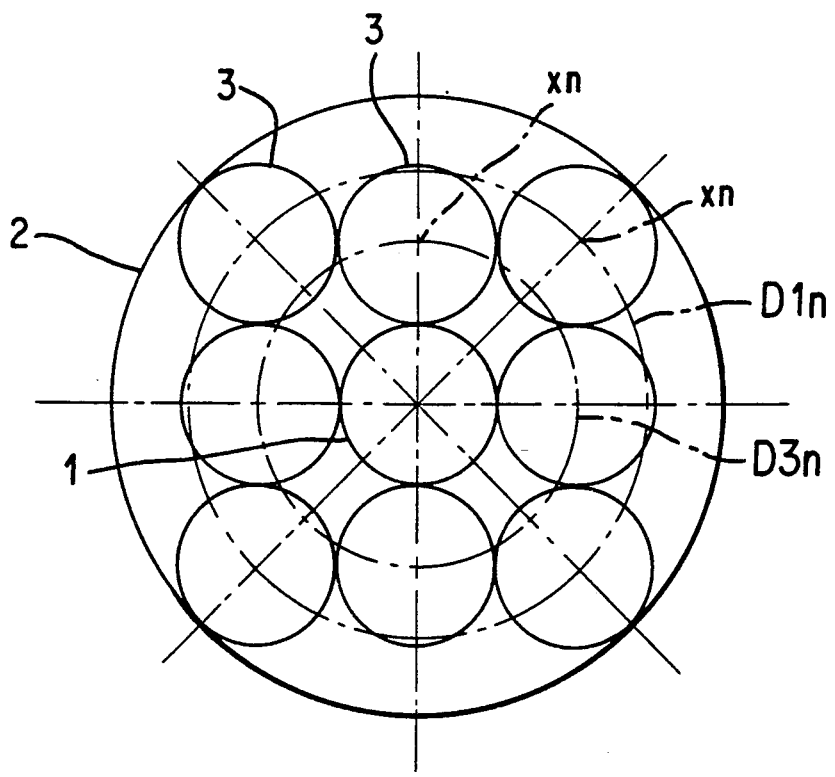

(D1n), (D3n)—multiples of orbital paths of rotational members (3) or (6) in FIG. 7

FIG. 1—represents an example of the said basic arrangement of the mechanism in accordance with this Invention in a form of a fixed ratio gearhead of an electric motor with a torque reaction means provided to a housing of the said gearhead.

FIG. 2—represents in schematic an example of the said full arrangement in form of a multifunction mechanism with optional outputs and torque reaction means options for speed change and reverse.

FIG. 3—represents in schematic an example of the mechanism in basic arrangement of fixed ratio where the rotational input is being applied to combined element (17) consisting of rotational members (2) and (5) and providing also a means of a housing to the mechanism and the torque reaction means being applied to rotational member (1) by a shaft (c).

FIG. 4—represents in schematic an example of the said mechanism where a rotational input is being applied to the rotational member (3) by means of shaft (a) arranged as tilting its rotational axis (x1n) so as to provide variable transmission ratio by means of friction transmission. The torque reaction means is being applied to the bearing of the input shaft (a).

FIG. 5—represents in schematic an example of the mechanism for reversing rotational sense by applying the torque reaction means to combined element (17) for one rotational sense or to (18) for opposite rotation of output.

Figure 6:
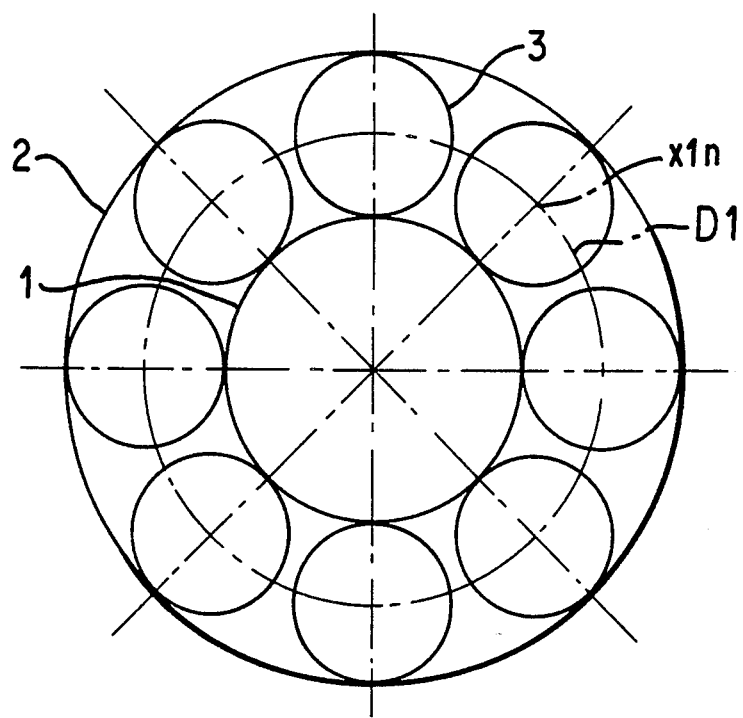

FIG. 6—represents in schematic an axial view at rotational unit (A) or (B) employing the rotational members (3) or (6) in one orbital path (D1) or (D2).

FIG. 7—represents in schematic an axial view at rotational unit (A) or (B) employing pluralities of rotational members (3) or (6) in multiple orbital path (D1n) and (D3n).

A rotational input being provided by the shaft (a) to the combined element (13) comprising of rotational members (1) and (4) and transmitted to rotational members (3) and (6) rotating in rotational axis (x1n) and (x2n) and in their their attributed axes being rotatably mounted to the combined element (14) consisting of the carrier plates (10) and (11) and the said rotational members (3) and (6) also orbiting in their attributed orbital paths (D1) and (D2) providing means of rotation to said combined element (14). Torque reaction means is being provided to the rotational member (2) by set screw to the housing of the gearhead so that rotational member (2) is being static and the rotation is being transmitted by means of rotating of the combined elements (13) and (14) to the rotational member (5) in appropriate rotational speed determined by difference in mean diameters of counterpart rotational members in rotational units (A) and (B) and to output shaft (b) in reduced rotational speed.

I claim:

1. A multifunction gearing mechanism having two rotational units, a first rotational unit having a first smaller inner rotational member fixed to input shaft rotatably mounted in common axis of rotation, a second larger outer rotational member fixed to stationary housing coaxially on the said common axis to circumferentially encompass said small member, said rotational members being mounted in one and the same radial plane, and at least a third rotational member mounted rotatably between the said first smaller member and the said second outer member as to provide rotational engagement within the first rotational unit; and a second rotational unit having a second smaller inner rotational member fixed also to the said input shaft rotatably mounted in the said common axis of rotation, the said first smaller inner rotational members of the said first and second rotational units being of different sizes, and also a second larger outer rotational member mounted to output shaft coaxially in the said common axis of rotation as to circumferentially encompass said first smaller member, said first smaller inner and second larger outer rotational members being mounted in one and the same radial plane, and at least a third rotational member mounted rotatably between said first smaller inner and second larger outer rotational members as to provide rotational engagement within the said second rotational unit, said third rotational members of said first and second rotational units being of different size and each said third rotational member of first and second rotational unit being independently and freely rotating on attributed individual and independent shafts, said shafts being mounted in individual and independent axes to a carrier plate, said carrier plate being rotatably mounted in said common axis of rotation between the said first and second rotational unit and the whole arrangement of said first and said second rotational units being spaced apart and arranged in two radial planes.

2. A multifunction gearing mechanism as claimed in claim 1 wherein the said first and second rotational unit each comprise said first smaller inner rotational member each having an outer rotational surface suitably shaped and each said second larger outer rotational member having an inner rotational surface suitably shaped, and disposed between and in physical contact with the said outer rotational surface and said inner rotational surface of said first and second rotational members in said first and second rotational units being the said third rotational members having an outer rotational surface suitably shaped to engage between the said first smaller inner and larger outer rotational members in each said rotational unit.

3. A multifunction gearing mechanism as claimed in claim 2 wherein the said physical contact of said suitably shaped rotational surfaces of the said rotational members is providing means of rotational engagement and rotational transmission from one member to another by means of friction or by teeth.

4. A multifunction gearing mechanism as claimed in claim 1 wherein multiple stages of the said rotational units are being employed.

* * * * *